US011109405B2

(12) United States Patent
Alasti et al.

(10) Patent No.: US 11,109,405 B2
(45) Date of Patent: Aug. 31, 2021

(54) DOWNLINK SCHEDULING ACROSS A CELLULAR CARRIER AGGREGATION

(71) Applicant: DISH Wireless L.L.C., Englewood, CO (US)

(72) Inventors: Mehdi Alasti, Reston, VA (US); Siddhartha Chenumolu, Broadlands, VA (US); Mariam Sorond, Reston, VA (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 16/678,974

(22) Filed: Nov. 8, 2019

(65) Prior Publication Data
US 2021/0051697 A1    Feb. 18, 2021

Related U.S. Application Data

(60) Provisional application No. 62/888,001, filed on Aug. 16, 2019.

(51) Int. Cl.
| H04W 72/00 | (2009.01) |
| H04W 72/12 | (2009.01) |
| H04W 72/04 | (2009.01) |
| H04W 24/08 | (2009.01) |
| H04W 72/08 | (2009.01) |
| H04B 17/309 | (2015.01) |

(52) U.S. Cl.
CPC ...... *H04W 72/1289* (2013.01); *H04B 17/309* (2015.01); *H04W 24/08* (2013.01); *H04W 72/0453* (2013.01); *H04W 72/08* (2013.01)

(58) Field of Classification Search
CPC ..... H04W 72/04; H04W 76/10; H04W 28/16; H04W 16/10; H04B 7/2121; H04B 7/2123; H04J 2203/0069
See application file for complete search history.

(56) References Cited

U.S. PATENT DOCUMENTS

| 2005/0207367 A1* | 9/2005 | Onggosanusi | ........ H04L 1/0003 370/315 |
| 2009/0073926 A1 | 3/2009 | Lee et al. | |
| 2011/0189997 A1* | 8/2011 | Tiwari | .................. H04W 36/00 455/443 |

(Continued)

OTHER PUBLICATIONS

International Search Report and Written Opinion for PCT/US2020/045707 dated Nov. 13, 2020, all pages.

(Continued)

*Primary Examiner* — Shantell L Heiber
(74) *Attorney, Agent, or Firm* — Kilpatrick Townsend & Stockton LLP

(57) ABSTRACT

Various systems and methods for scheduling data transmissions from a base station to user equipment (UE) are presented. Channel quality indicator values that correspond to multiple UE may be determined for multiple carrier components of a cellular network's carrier aggregation. A scheduling matrix may be created that includes instantaneous data transfer rates for the UE. Elements within the scheduling matrix may be normalized by modifying instantaneous data transmission rates using average data transmission rates. Scheduling decisions for data transfers may be made for the UE based on the normalized scheduling matrix.

18 Claims, 5 Drawing Sheets

(56) References Cited

U.S. PATENT DOCUMENTS

| | | | | |
|---|---|---|---|---|
| 2012/0113794 | A1* | 5/2012 | Roman | H04B 7/0452 |
| | | | | 370/201 |
| 2013/0163541 | A1* | 6/2013 | Roh | H04W 72/10 |
| | | | | 370/329 |
| 2014/0071869 | A1* | 3/2014 | Mathew | H04W 52/02 |
| | | | | 370/311 |
| 2014/0126359 | A1* | 5/2014 | Sarkar | H04W 72/0486 |
| | | | | 370/230 |
| 2014/0355540 | A1* | 12/2014 | Accongiagioco | |
| | | | | H04W 72/1231 |
| | | | | 370/329 |
| 2015/0236839 | A1* | 8/2015 | Shah | H04W 72/042 |
| | | | | 370/329 |
| 2015/0282163 | A1* | 10/2015 | Stanze | H04L 1/1887 |
| | | | | 370/329 |
| 2015/0318966 | A1* | 11/2015 | Liu | H04W 28/16 |
| | | | | 370/329 |
| 2015/0351106 | A1 | 12/2015 | Wijetunge et al. | |
| 2018/0007580 | A1* | 1/2018 | Kang | H04W 28/12 |
| 2018/0175924 | A1* | 6/2018 | Ercan | H04W 76/16 |
| 2020/0351198 | A1* | 11/2020 | Majmundar | H04W 28/20 |

OTHER PUBLICATIONS

Nararat Ruangchaijatupon et al., "MAC 10-2—Simple Proportional Fairness Scheduling for OFDMA Frame-Based Wireless Systems", Wireless Communications and Networking Conference, 2008. WCNC 2008. IEEE, IEEE, Piscataway, NJ, USA, Mar. 31, 2008, pp. 1593-1597, XP031243870, ISBN: 978-1-4244-1997-5 p. 1593, right-hand column, paragraph II.—p. 1595 figure 1.

* cited by examiner

DOWNLINK SCHEDULING ACROSS A CELLULAR CARRIER AGGREGATION

CROSS-REFERENCE TO RELATED APPLICATION

This Application claims priority to U.S. Provisional Patent Application No. 62/888,001, entitled "Methods and Systems for Scheduling Across a Cellular Carrier Aggregation," filed on Aug. 16, 2019, the entire disclosure of which is hereby incorporated by reference for all purposes.

BACKGROUND

When scheduling data transmissions between a wireless device and a base station, communication resources, such as physical resource blocks, may be allocated in an attempt to increase the overall efficiency of the cellular network. Further, scheduling may need to be performed in a fair manner such that different wireless devices are provided an opportunity to transmit data to the cellular network. Embodiments detailed herein are focused on arrangements for allocating spectrum across user equipment in an efficient manner.

SUMMARY

Various embodiments are described related to a method for scheduling data transmissions from a base station to user equipment (UE). In some embodiments, a method for scheduling data transmissions from a base station to user equipment (UE) is described. The method may comprise determining, by a cellular network, a plurality of channel quality indicator (CQI) values that may correspond to a plurality of UE. For each UE of the plurality of UE, a CQI value of the plurality CQI values may be determined for each carrier component of a plurality of carrier components that may make up a carrier aggregation. The method may comprise determining, by the cellular network, an average data transfer rate for each UE of the plurality of UE. The method may comprise creating, by a scheduler system of the cellular network, a scheduling matrix comprising a plurality of elements storing a plurality of instantaneous data transfer rates based on the determined plurality of CQI values. The method may comprise normalizing, by the scheduler system of the cellular network, each element of the plurality of elements of the scheduling matrix by modifying the plurality of instantaneous data transfer rates that may be based on a plurality of average data transfer rates. Each average data transfer rate of the plurality of average data transfer rates may correspond to a UE of the plurality of UE mapped to the element of the plurality of elements. The method may comprise making, by the scheduler, scheduling decisions for the plurality of UE based on the normalized scheduling matrix.

Embodiments of such a method may include one or more of the following features: The method may further comprise transmitting, by the base station of the cellular network, data to the plurality of UE based on the scheduling decisions. The cellular network may use 5G New Radio (NR) Radio Access Technology (RAT) for communication with the UE. Each row of the scheduling matrix may correspond to a physical resource block (PRB) of a plurality of PRBs. Each column of the scheduling matrix may correspond to a UE of the plurality of UE. Each PRB of the plurality of PRBs may correspond to one of the plurality of carrier components. For each row of the scheduling matrix, removing entries that correspond to a carrier component of the plurality of carrier components for which the corresponding UE of the row may be out of range of communications from the base station on the carrier component. For each row of the scheduling matrix, removing entries that may correspond to a PRB of the plurality of PRBs that may be outside of one or more active bandwidth parts (BWPs) for which the corresponding UE of the row may be assigned. For each UE of the plurality of UE, the CQI value of the plurality of CQI values that may correspond to each carrier component of the plurality of carrier components and the UE may be used to calculate the average data transfer rate. The method may further comprise identifying, by the scheduler system, an element of the plurality of elements of the scheduling matrix that may have a maximum value among the plurality of elements. The method may further comprise assigning the PRB of the plurality of PRBs that may correspond to the element to the UE of the plurality of UE that may correspond to the element. The method may further comprise determining that an additional PRB may not be needed for data transmission to the UE for which the PRB may be assigned. The method may further comprise removing all other entries for the UE within the scheduling matrix in response to determining that the additional PRB may not be needed for data transmission to the UE. The method may further comprise determining that an additional PRB may be needed for data transmission to the UE for which the PRB may be assigned. The method may further comprise updating the data transfer rate for all other elements mapped to the UE within the scheduling matrix in response to determining that the additional PRB may be needed for data transmission to the UE. Updating the data transfer rate may comprise all other elements mapped to the UE being decreased in magnitude.

In some embodiments, a cellular network that may schedule downlink data transmissions is described. The network may comprise a base station that may comprise a scheduler system. The base station may be configured to determine a plurality of channel quality indicator (CQI) values that may correspond to a plurality of UE. For each UE of the plurality of UE, a CQI value of the plurality CQI values may be determined for each carrier component of a plurality of carrier components that may make up a carrier aggregation. The base station may be configured to determine an average data transfer rate for each UE of the plurality of UE. The base station may be configured to create a scheduling matrix comprising a plurality of elements storing a plurality of instantaneous data transfer rates. The base station may be configured to normalize each element of the plurality of elements of the scheduling matrix by modifying the plurality of instantaneous data transfer rates based on a plurality of average data transfer rates. Each average rate of the plurality of average data transfer rates may correspond to a UE of the plurality of UE mapped to the element of the plurality of elements. The base station may be configured to make scheduling decisions for the plurality of UE based on the normalized scheduling matrix.

Embodiments of such a network may include one or more of the following features: The cellular network may further comprise the plurality of UE. The base station may be a gNodeB and the cellular network may be a 5G New Radio (NR) radio access technology (RAT) cellular network. The cellular network may comprise a plurality of base stations that each may be configured to perform the functions of the base station. The base station may be further configured to transmit data to the plurality of UE based on the scheduling decisions. Each row of the scheduling matrix may correspond to a physical resource block (PRB) of a plurality of PRBs. Each column of the scheduling matrix may correspond to a UE of the plurality of UE. Each PRB of the plurality of PRBs may correspond to one of the plurality of carrier components. The base station may be further configured to identify an element of the plurality of elements of the scheduling matrix that may have a maximum value among the plurality of elements. The base station may be further configured to assign the PRB of the plurality of PRBs that may correspond to the element to the UE of the plurality of UE that may correspond to the element. The base station may be further configured to determine that an additional PRB may not be needed for data transmission to the UE for which the PRB may be assigned. The base station may be further configured to remove all other entries for the UE within the scheduling matrix in response to determining that the additional PRB may not be needed for data transmission to the UE.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
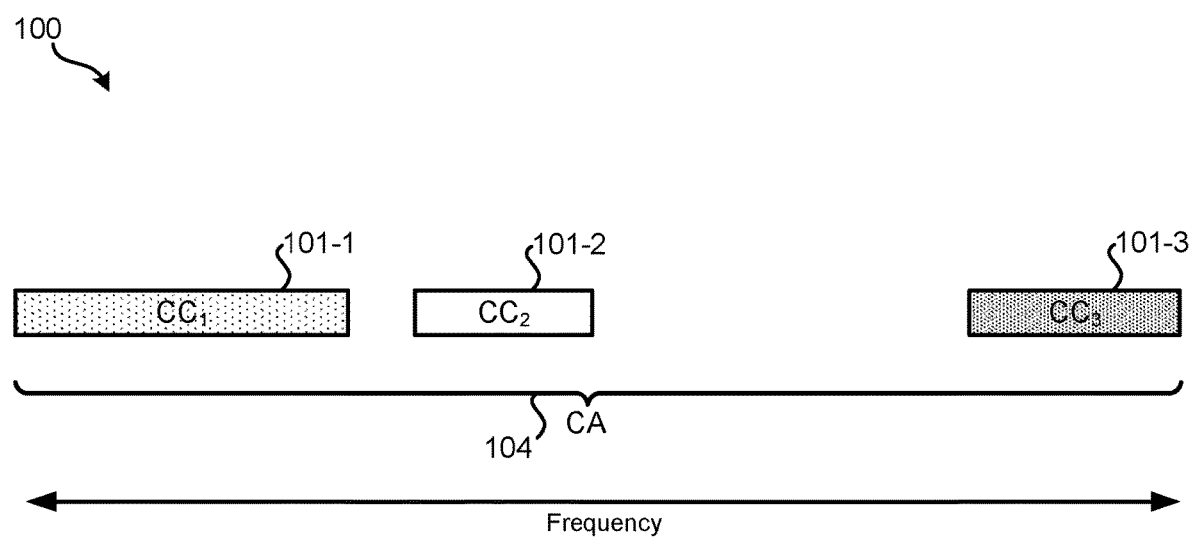
FIG. 1 illustrates an embodiment of multiple carrier components (CCs) forming a carrier aggregation (CA).

FIG. 1 illustrates an embodiment 100 of multiple carrier components (CCs) forming a carrier aggregation (CA). A cellular network carrier may have the rights to various portions of spectrum that are not continuous. For instance, the rights to various portions of spectrum may have been acquired over time from various sources. In embodiment 100, three carrier components are present: carrier component 101-1, carrier component 101-2, and carrier component 101-3. These carrier components may vary in bandwidth. For instance CC 101-1 may have greater bandwidth than CC 101-2. The cellular network carrier may not be permitted to use the frequencies between CC 101-1 and CC 101-2 or between CC 101-2 and CC 101-3.

CCs 101 can be spread across a wide range of frequencies. For instance, CC 101-1 can be centered around 600 MHz, CC 101-2 can be centered around 800 MHz; and CC 101-3 can be centered around 1.9 GHz. It can be expected that the signal strength between the base station (BS) and the user equipment (UE) of each CC will vary based on the UE's location in relation to the BS due to distance and obstacles between the UE and the BS. For example, a UE may experience a greater signal strength from the BS on CC 101-1 than CC 101-3 due to the path-loss dependency on frequency. Generally, the higher the frequency, the greater the path-loss. Embodiments detailed herein are focused on fair and proportional arrangements for scheduling communication between the BS and the UE across the entire CA.

While embodiment 100 illustrates three CCs, it should be understood that this number is only an example. Fewer or greater numbers of CCs are possible; for instance, Rep-15 NR can support a carrier aggregation up to sixteen carrier components. In some embodiments, only a single CC may be present. In other embodiments 2, 4, 5, 6, or more CCs may be present. Further, bandwidth of individual CCs may vary; for example, for a 5G NR cellular network, the bandwidth of each CC may be up to 100 MHz and the total carrier aggregation bandwidth can be up to 1 GHz.

Figure 2:
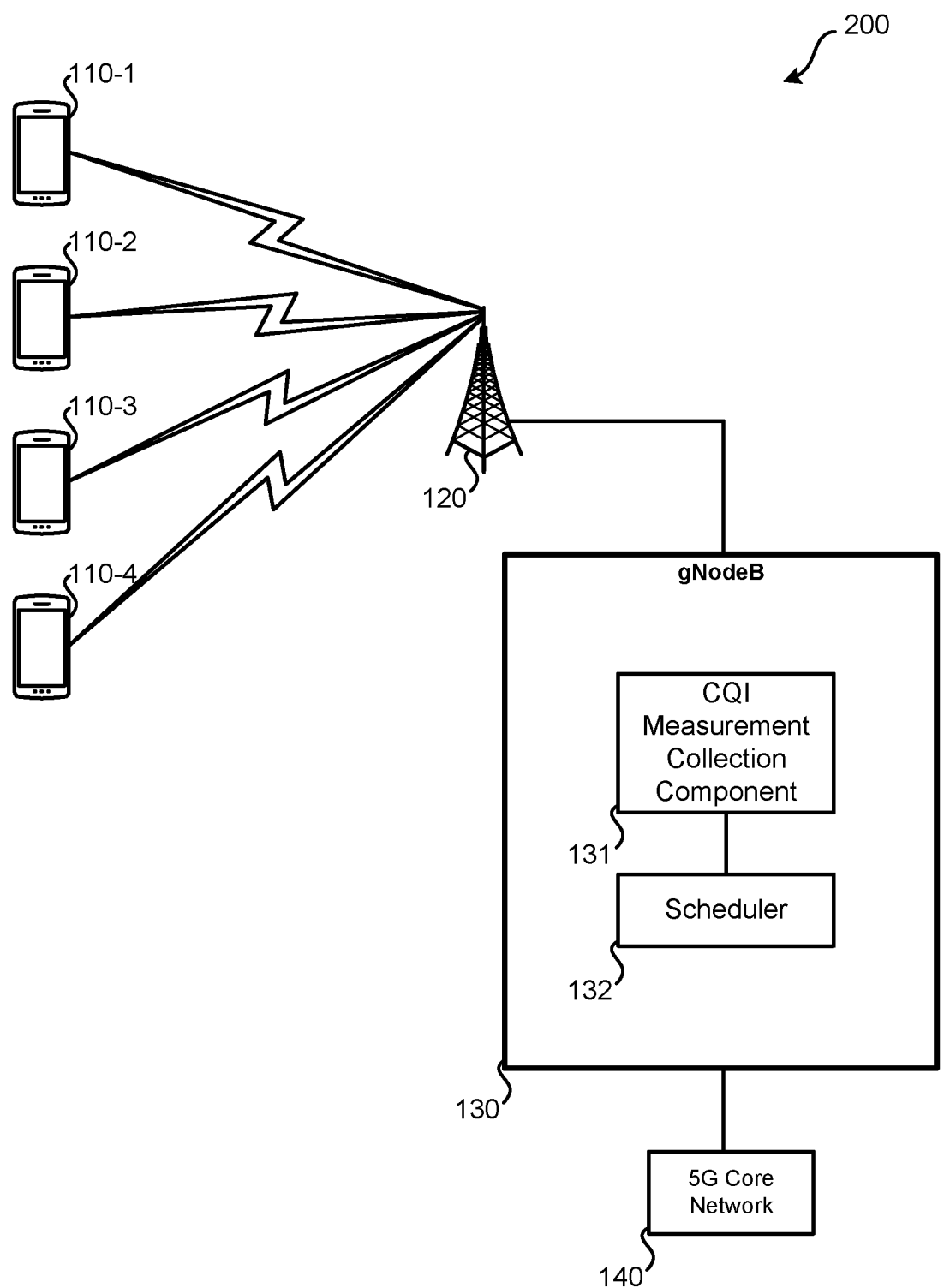
FIG. 2 illustrates an embodiment of a cellular system that can perform proportional fair scheduling.

FIG. 2 illustrates an embodiment of a cellular system 200 that can perform proportional fair scheduling. Cellular system 200 can include: UE 110; base station tower 120; gNodeB 130; and 5G core network 140. Collectively, BS tower 120 and gNodeB 130 may be referred to as a BS. While cellular system 200 refers to 5G and gNodeBs, the embodiments detailed herein can be applicable to other types of cellular networks, such as a 4G Long Term Evolution (LTE) cellular network, that uses eNodeBs in place of gNodeBs. Cellular system 200 operates according to the 5G New Radio (NR) radio access technology (RAT). In other embodiments, a different RAT may be used, such as 3G, 4G Long Term Evolution (LTE), or some other RAT. In some embodiments, a 5G network may use an evolved packet core (EPC). Communications from base station tower 120 to UE 110 may be scheduled. Various physical resource blocks (PRBs) may be available across the multiple CCs of a CA for communication. Each PRB may define a timeslot on a particular frequency within a CC. The number of PRBs available on a given CC is dependent on the bandwidth of the CC and the subcarrier spacing (SCS) of the CC.

UEs 110 can be various forms of wireless devices that are capable of communication according to the RAT of cellular system 200. For instance, UEs 110 can be smartphones, wireless modems, cellular phones, laptop computers, wireless access points (APs), etc. In response to data received from BS tower 120, each UE may perform signal strength measurements. A channel quality indicator (CQI) may be an index value that is representative of the downlink (from gNB to UE) channel quality. The CQI is indicative of a specific data transfer rate than can be achieved between the UE and the BS. Since different CCs of the CA are at different frequencies, the CQI for PRBs in different CCs of the CA can vary. Therefore, in some situations, higher or lower data transfer rates can be realized on one CC than other CCs of the CA. Further, especially for CCs having a large bandwidth, it may be possible that the CQI varies for a UE within the same CC. For instance, the CQI may be higher near the lower end of the CC's bandwidth than near the higher end of the CC's bandwidth.

In the illustrated embodiment of FIG. 2, the RAT of the cellular network is 5G NR. As such, the BS includes a gNodeB (gNB). In other embodiments, the BS may include a different system for controlling communication with UE. For instance, in a 4G LTE cellular network, an eNodeB (eNB) may be used in place of the gNB. In the illustrated embodiment, gNodeB 130 comprises: CQI measurement collection component 131; and scheduler 132. For other types of wireless networks, these components may be part of the BS or may be part of the core wireless network. In cellular system 200, scheduler 132 is performed by gNB 130, but in other embodiments, it may be possible for a component of 5G core network 140 to perform scheduling tasks.

CQI measurement collection component 131 may receive and store CQI measurements received from UE 110. Every PRB data transmission has at least some reference signals, a UE can measure the quality of the reference signals to obtain a CQI measurement. Therefore, the CQI measurement is indicative of the downlink channel quality of PRBs on which data was previously-received by the UE on a PRB from the BS. From these received CQIs for a given UE, scheduler 132 can create a proportionally fair schedule that takes into account each UE's CQI across the entire CA. In other embodiments, rather than using CQI measurements, some other indication of signal strength or channel quality may be used. Scheduler 132 creates a schedule for data transmissions across the CA based on channel quality experienced by each UE on individual CCs. Details of how scheduler 132 functions is described in relation to FIG. 3. The functionality of scheduler 132 and CQI measurement collection component 131 may be performed using one or more processors and one or more non-transitory processor readable mediums.

Scheduler 132 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

In FIG. 2, a single gNodeB is illustrated. In a cellular network, a large number of gNodeBs or, more generally, base stations may be present. Each BS may have its own scheduler that is locally incorporated as part of the BS or is part of a system that communicates with the BS. For instance, it may be possible for a gNodeB to communication with multiple base station towers that are scattered over a geographical area. Therefore, it may be possible for scheduler 132 to manage scheduling for multiple base station towers.

Figure 3:
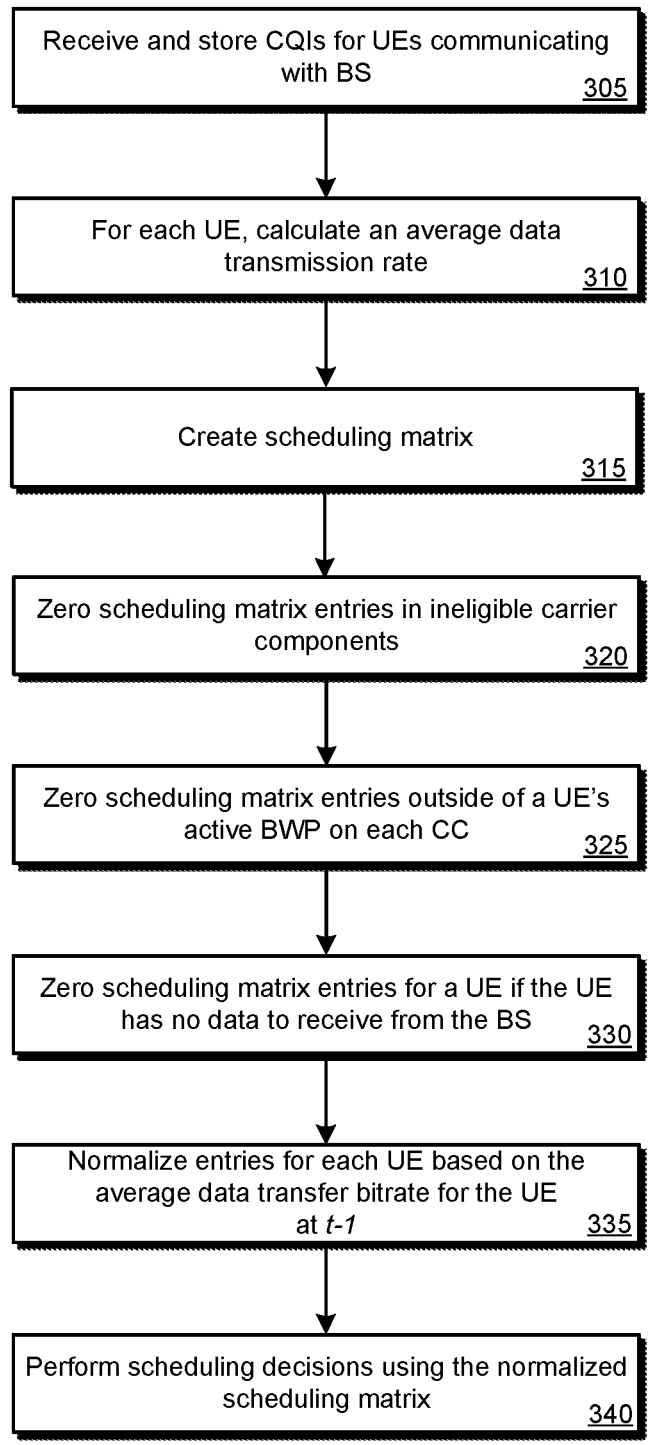
FIG. 3 illustrates an embodiment of a method for scheduling.

Various methods may be performed using the embodiments and systems detailed in relation to FIGS. 1 and 2. FIG. 3 illustrates an embodiment of a method 300 for scheduling. Method 300 may be performed by the components of a base station, such as a gNB of a 5G NR RAT cellular network or an eNB of a 4G LTE RAT cellular network. More specifically, blocks of method 300 may be performed by CQI measurement collection component 131 and scheduler 132 of FIG. 2.

At block 305, CQIs may be received by a BS from the UEs communicating with a BS. The CQIs may be received by the base station (e.g., gNB) and stored. Each CQI may be indicative of the quality on a particular resource block on which the UE previously received data. Multiple CQIs may be received from and stored for each UE. For instance, a separate CQI may be received for each PRB on which data was previously transmitted to the UE. If the UE received data across each CC of the CA, then at least one CQI may be stored that is representative of the channel quality on each CC of the CA. Due to a UE having been assigned an active bandwidth part (BWP) for each CC, there may be PRBs for which a CQI value is not available for a specific UE. In some embodiments, only a most recent or an average of most-recent CQIs for a particular CC may be stored. In other embodiments, multiple CQIs, such as for each PRB within a CC, may be stored for each UE. By storing multiple CQIs for a given CC, it may be possible to take into account variances in channel quality that occurs over the bandwidth of a CC. For instance, a UE may experience different channel qualities on the lower frequency portion of a CC as compared to the higher frequency portion.

At block 310, which may be performed before, while CQI data is being populated at block 305, or afterwards, a historical data transmission rate, which may be an average data transmission rate, may be calculated for each UE by the scheduler. Therefore, a single historical data transmission rate may be calculated for each UE. A historical data transmission rate, $r_n(t)$, may be calculated according to the exponential filter expressed in Equation 1:

$$r_n(t) = \left(1 - \frac{1}{T}\right)r_n(t-1) + \frac{1}{T}R_n(t) \qquad \text{Eq. 1}$$

In Equation 1, n indicates the nth UE and t indicates the time for which scheduling is currently being performed. Therefore, $r_n(t-1)$ represents the historical data transmission rate for the immediately-preceding scheduling time. Therefore, the scheduler may store or have access to stored average data transmission rates for each UE. T represents the time constant of the exponential filter. In some embodiments, the value of T may be between 3 and 5. While Equation 1 provides one possible way in which the average data rate may be calculated using an exponential filter, other various filtering methods can be used to find a historical data transmission rate.

$R_n(t)$ represents the instantaneous rate of $UE_n$ at scheduling time t. $R_n(t)$ is based on the determined CQI for a particular PRB. Based on the CQI, the number of data bits in a PRB varies. While the total number of symbols transmitted as part of a PRB stays the same, as the channel quality increases, the percentage of symbols that can be devoted to data in a PRB compared to error correction increases. Therefore, for different PRBs, a separate $R_n(t)$ value may be computed based on previously-measured CQI values.

The calculated value of $r_n(t)$ may be stored by the scheduler. For scheduling during the next time period, the $r_n(t)$ may be used as $r_n(t-1)$.

Figure 4:
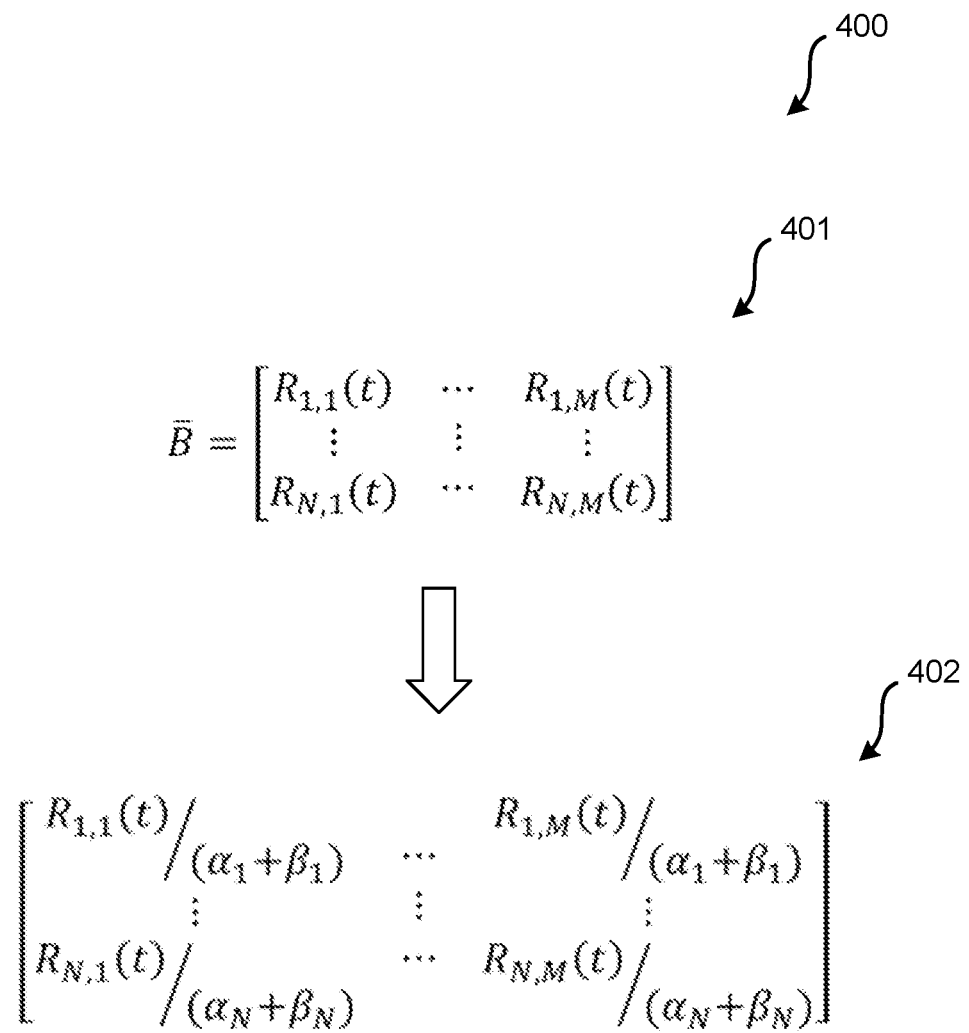
FIG. 4 illustrates an embodiment of scheduling matrices.

At block 315, a scheduling matrix may be created. The scheduling matrix may be created such than entries are present that correspond to each PRB of the CA and the UEs connected with the BS. Since the PRBs are spread across the entire CA, the scheduling matrix includes PRBs for each CC of the CA. In some embodiments, each row of the scheduling matrix corresponds to a different UE. (In other embodiments, each column of the scheduling matrix corresponds to a different UE.) Each column may correspond to a different PRB; therefore, columns will correspond to PRBs on different CCs of the CA. (In other embodiments, different rows can correspond to different PRBs.) Therefore, each entry within the scheduling matrix corresponds to a particular UE and PRB. FIG. 4 illustrates an embodiment 400 of scheduling matrices. Scheduling matrix 401 has entries for N UEs and MPRBs. The value of each entry, R, represents the instantaneous downlink data rate of a UE, which is dependent on CQI. Therefore, the instantaneous rate of $UE_n$ sending on $PRB_m$ is $R_{nm}(t)$.

At block 320, for each UE for which a row is present in the scheduling matrix, matrix elements are set to zero if the UE is unable to receive data on the carrier component associated with the PRB. For instance, the farther a UE is from a BS, higher-frequency CCs may not have a sufficient signal strength to be used for communication.

Additionally or alternatively, despite a UE potentially being able to communicate using a given CC, the UE may only be permitted to use a portion of the CC. Each UE may have been provided an active BWP definition that defines a portion of each CC that is eligible to be used by the UE or potentially excludes one or more entire CCs from use. For instance, if the CA includes three CCs, each UE may have three active BWP definitions for uplink communications and three active BWP definitions for downlink communications. At block 325, for each UE for which a row is present in the scheduling matrix, matrix elements are set to zero by the scheduler for PRBs that not within the UE's active downlink BWP on each CC of the CA.

At block 330, for each UE that the scheduler determines does not have any data pending for transmission via a downlink to the UE, all entries for the UE are set to zero. Therefore, each entry of the entire row of entries in the scheduling matrix corresponding to the UE is set to zero (or otherwise ignored) when no data is pending transfer to the UE. The order of operations of blocks 320-330 can be performed in any order.

At block 335, each entry of the scheduling matrix may be normalized. By block 335, the scheduling matrix may be sparse, meaning that many of the elements are zero. The normalization process of block 335 does not result in the zeroed entries within the scheduling matrix changing. Rather, for each UE, non-zero entries within the scheduling matrix will be adjusted based on the average data transfer bitrate of the UE. This normalization is reflected in normalized scheduling matrix 402 in which each entry is divided by the average data transfer bitrate $r_N(t-1)$, represented by $\alpha_N$. The process of normalizing of block 335 can help make scheduling proportionally fairer. That is, UEs that have previously had a relatively lower data transfer rate will be prioritized over UEs that have previously had a relatively higher data transfer rate by the instantaneous transfer rate being divided by a smaller number. Initially, all $\beta_N$ values are zero. Further detail regarding computation of $\beta_N$ is provided in relation to FIG. 5.

At block 340, once the scheduling matrix has been normalized, a sparse matrix is present in which normalized entries are present for: 1) only UEs that have data pending to be sent to the UE from the BS; 2) PRBs that are within CCs that the UE can receive based on signal strength and BWP definition; and 3) fall within one of the UE's active downlink BWP definitions. All other entries within the scheduling matrix are set to zero.

An example of such a normalized scheduling matrix that has been created according to method 300 is shown in Table 1.

TABLE 1

|  | $UE_1$ | $UE_2$ | $UE_3$ | $UE_4$ | $UE_5$ | $UE_6$ |
|---|---|---|---|---|---|---|
| $PRB_1$ | $\dfrac{R_{1,1}(t)}{\alpha_1 + \beta_1}$ | 0 | $\dfrac{R_{3,1}(t)}{\alpha_3 + \beta_3}$ | $\dfrac{R_{4,1}(t)}{\alpha_4 + \beta_4}$ | 0 | 0 |
| $PRB_2$ | 0 | 0 | 0 | 0 | 0 | $\dfrac{R_{6,2}(t)}{\alpha_6 + \beta_6}$ |
| $PRB_3$ | $\dfrac{R_{1,3}(t)}{\alpha_1 + \beta_1}$ | 0 | $\dfrac{R_{3,3}(t)}{\alpha_3 + \beta_3}$ | 0 | 0 | $\dfrac{R_{6,3}(t)}{\alpha_6 + \beta_6}$ |
| $PRB_4$ | 0 | 0 | $\dfrac{R_{3,4}(t)}{\alpha_3 + \beta_3}$ | $\dfrac{R_{4,4}(t)}{\alpha_4 + \beta_4}$ | 0 | 0 |
| $PRB_5$ | $\dfrac{R_{1,5}(t)}{\alpha_1 + \beta_1}$ | 0 | 0 | 0 | 0 | $\dfrac{R_{6,5}(t)}{\alpha_6 + \beta_6}$ |
| $PRB_6$ | 0 | 0 | 0 | $\dfrac{R_{4,6}(t)}{\alpha_4 + \beta_4}$ | 0 | $\dfrac{R_{6,6}(t)}{\alpha_6 + \beta_6}$ |

In Table 1, an example scheduling matrix is shown for six UE and six PRBs. It should be understood that in a real-world implementation, the number of UEs and PRBs is likely much greater. However, it is also possible that fewer UEs, fewer PRBs, or both are present. Table 1 is sparse due to the removing (e.g., zeroing out) of various entries based on block 320, block 325, and block 330 of method 300. As an example, $PRB_6$ was zeroed for $UE_1$ because $PRB_6$ is part of an ineligible CC for $UE_1$. As another example, $PRB_2$ was zeroed for $UE_4$ because $PRB_2$ is outside of the BWP definition for the CC on which $PRB_2$ is present. Continuing with the example, all entries for $UE_2$ and $UE_5$ were zeroed because these UEs do not have any data to be received from the BS.

Figure 5:
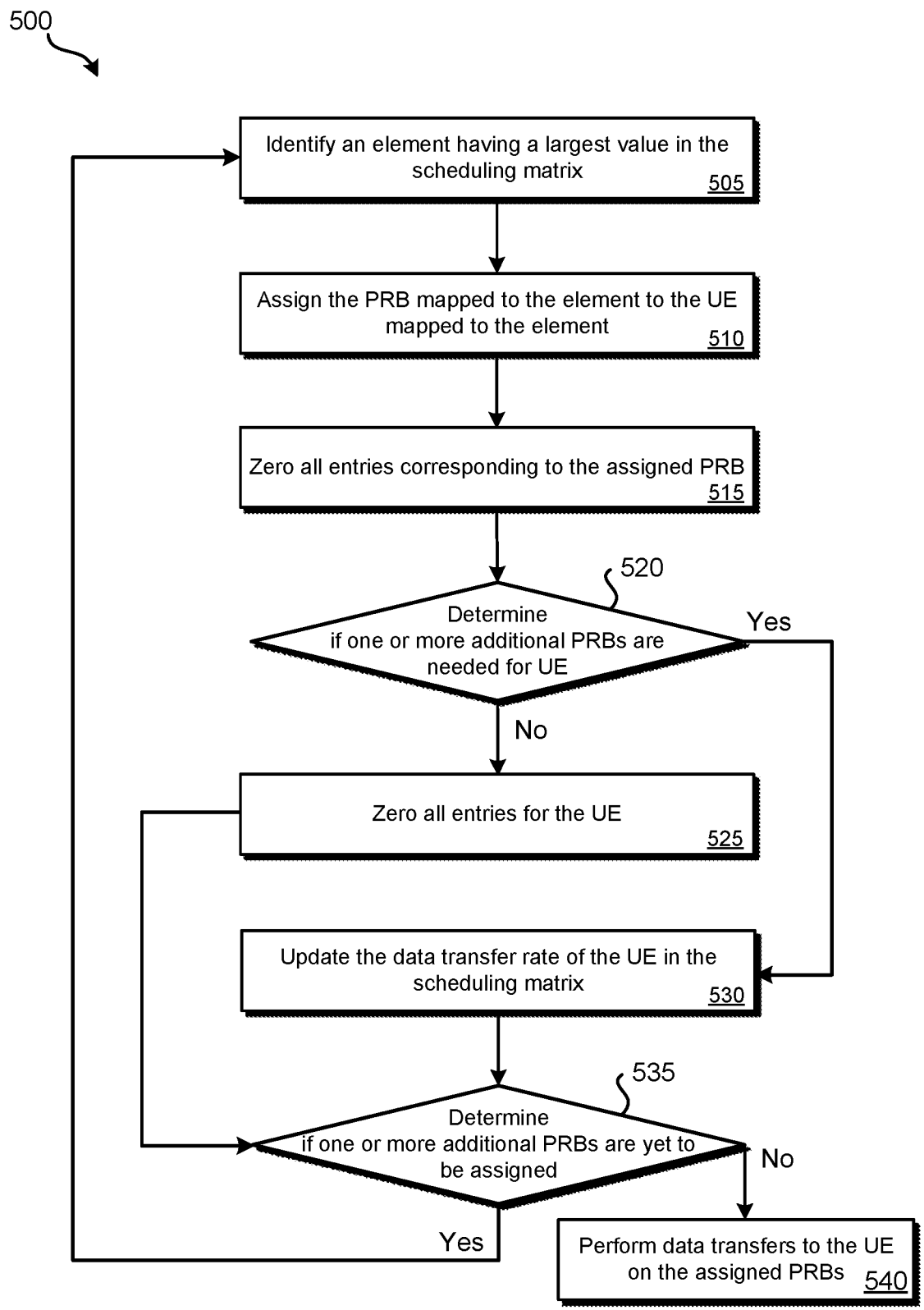
FIG. 5 illustrates an embodiment of a method of how scheduling decisions are performed using a normalized scheduling matrix.

FIG. 5 illustrates an embodiment of a method 500 of how the scheduling decisions of block 340 are performed using the normalized scheduling matrix. Method 500 may be performed by the components of a base station, such as a gNB of a 5G NR RAT cellular network or an eNB of a 4G LTE RAT cellular network. More specifically, blocks of method 500 may be performed by scheduler 132 of FIG. 2. All of method 500 may be performed as part of block 340 of method 300 or may be performed using a scheduling matrix created according to some other method.

At block 505, the element in any row or column having the largest value within the scheduling matrix is selected. This element is mapped to a UE (e.g., by row) and to a PRB (e.g., by column). At block 510, the PRB mapped to the largest value is assigned to the UE mapped to the largest value. Block 510 can involve modifying the block to indicate that it has been assigned to the particular UE. Alternatively, a separate table or data storage arrangement may be created that indicates that the particular PRB has been assigned to the UE.

Since the PRB has now been assigned and any PRB can only be assigned to a single UE for a given time, all other entries for the PRB in the matrix are removed, such as by converting to zeros, at block 515 or are otherwise removed. For example, referring back to the example of Table 1, in Table 2, element (UE$_3$, PRB$_3$) was determined to have the greatest value. Therefore, PRB$_3$ is assigned to UE$_3$. Table 2, which is a modified version of Table 1, reflects that other entries in the row corresponding to PRB$_3$ have been zeroed out.

transfer rate of the UE in the scheduling matrix is updated. While $\alpha_N$ reflects the average data transfer rate, $\beta_N$ reflects the data transfer bitrate assigned to a UE during the current scheduling process. Collectively, $\alpha_N + \beta_N$ can represent the UE's data transfer bitrate. As more PRBs are assigned to a particular UE during a scheduling process, the value of $\beta_N$ will be increased to reflect the transfer bitrate currently assigned to the UE. Therefore, as $\beta_N$ increases, the magnitude of the value of the corresponding element within the scheduling matrix can decrease. To perform the updating, $\beta_N$ for each entry corresponding to the UE that has been assigned a PRB, is updated to reflect the data rate that will be transmitted to the UE on the assigned PRB. Therefore, $\beta_N$

TABLE 2

|      | UE$_1$ | UE$_2$ | UE$_3$ | UE$_4$ | UE$_5$ | UE$_6$ |
|------|--------|--------|--------|--------|--------|--------|
| PRB$_1$ | $\dfrac{R_{1,1}(t)}{\alpha_1 + \beta_1}$ | 0 | $\dfrac{R_{3,1}(t)}{\alpha_3 + \beta_3}$ | $\dfrac{R_{4,1}(t)}{\alpha_4 + \beta_4}$ | 0 | 0 |
| PRB$_2$ | 0 | 0 | 0 | 0 | 0 | $\dfrac{R_{6,2}(t)}{\alpha_6 + \beta_6}$ |
| PRB$_3$ | 0 | 0 | $\dfrac{R_{3,3}(t)}{\alpha_3 + \beta_3}$ ASSIGNED | 0 | 0 | 0 |
| PRB$_4$ | 0 | 0 | $\dfrac{R_{3,4}(t)}{\alpha_3 + \beta_3}$ | $\dfrac{R_{4,4}(t)}{\alpha_4 + \beta_4}$ | 0 | 0 |
| PRB$_5$ | $\dfrac{R_{1,5}(t)}{\alpha_1 + \beta_1}$ | 0 | 0 | 0 | 0 | $\dfrac{R_{6,5}(t)}{\alpha_6 + \beta_6}$ |
| PRB$_6$ | 0 | 0 | 0 | $\dfrac{R_{4,6}(t)}{\alpha_4 + \beta_4}$ | 0 | $\dfrac{R_{6,6}(t)}{\alpha_6 + \beta_6}$ |

At block 520, it is determined whether the UE to which the PRB was assigned at block 510 is in need of any additional PRBs for data to be transmitted to the UE. For instance, the amount of data to be transmitted via the downlink to the UE may be able to fit within a single PRB. Alternatively, for a larger amount of data, one or more additional PRBs may be needed. If no additional PRBs are needed, method 500 proceeds to block 525. At block 525, at least all other entries for the UE are removed, such as by converting the values to zero. Therefore, the entire row for the UE can be converted to all zeros. Method 500 then proceeds to block 535.

If, at block 520, one or more additional PRBs are needed for the downlink transmission to the UE, method 500 proceeds to block 530. At block 530, the (downlink) data is dependent on the CQI previously measured on the PRB (or the CC) by the UE. Using $\beta_N$ to adjust the UE's entries in the scheduling matrix has the effect of increasing the dominator of each value in the UE's row and deprioritizing the UE compared to other UEs since the magnitude of the UE's values will be decreased and therefore be less likely to be selected during a subsequent assignment of another PRB.

Continuing with the previous example of Table 1 and Table 2, assuming additional data needs to be transmitted to UE$_3$ that requires an additional PRB, the other entries corresponding to UE$_3$ have their value of $\beta_N$ updated. The updated value of $\beta_N$ reflects the data transfer bitrate that will occur using PRB$_3$. Table 3 reflects such an update having been performed.

TABLE 3

|      | UE$_1$ | UE$_2$ | UE$_3$ | UE$_4$ | UE$_5$ | UE$_6$ |
|------|--------|--------|--------|--------|--------|--------|
| PRB$_1$ | $\dfrac{R_{1,1}(t)}{\alpha_1 + \beta_1}$ | 0 | $\dfrac{R_{3,1}(t)}{\alpha_3 + \beta_3}$ ($\beta_3$ updated) | $\dfrac{R_{4,1}(t)}{\alpha_4 + \beta_4}$ | 0 | 0 |
| PRB$_2$ | 0 | 0 | 0 | 0 | 0 | $\dfrac{R_{6,2}(t)}{\alpha_6 + \beta_6}$ |
| PRB$_3$ | 0 | 0 | ASSIGNED | 0 | 0 | 0 |

TABLE 3-continued

| | UE$_1$ | UE$_2$ | UE$_3$ | UE$_4$ | UE$_5$ | UE$_6$ |
|---|---|---|---|---|---|---|
| PRB$_4$ | 0 | 0 | $\dfrac{R_{3,4}(t)}{\alpha_3 + \beta_3}$ ($\beta_3$ updated) | $\dfrac{R_{4,4}(t)}{\alpha_4 + \beta_4}$ | 0 | 0 |
| PRB$_5$ | $\dfrac{R_{1,5}(t)}{\alpha_1 + \beta_1}$ | 0 | 0 | 0 | 0 | $\dfrac{R_{6,5}(t)}{\alpha_6 + \beta_6}$ |
| PRB$_6$ | 0 | 0 | 0 | $\dfrac{R_{4,6}(t)}{\alpha_4 + \beta_4}$ | 0 | $\dfrac{R_{6,6}(t)}{\alpha_6 + \beta_6}$ |

If PRB$_3$ was the first PRB assigned, values of β for all other UE may still be zero. By the value of β$_3$ being updated, the values in the column for UE$_3$ are recalculated which will result in each value decreasing; thus decreasing the likelihood that one of these value will be the next-largest value for assignment.

At block 535, a determination is made by the scheduler whether one or more additional PRBs have yet to be assigned. If yes, method 500 returns to block 505. At block 505, the current element having the largest value in the modified scheduling matrix is identified and blocks 505-530 are repeated. Returning to the example of Table 3, only PRB$_3$ has been assigned. Therefore, method 500 may repeat until PRB$_1$, PRB$_2$, PRB$_4$, PRB$_5$, and PRB$_6$ are assigned. Therefore, in this example of Tables 1-3, five more iterations of method 500 may be performed. In the examples of Tables 1-3, it should be understood that the table can be pivoted such that PRBs are assigned columns and UEs are assigned rows.

If a determination of no is made at block 535, method 500 may proceed to block 540. At block 540, scheduling is complete and downlink data transfers to the various UE may be performed by the BS in accordance with the assignments made during method 500.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for scheduling data transmissions from a base station to user equipment (UE), the method comprising:
   determining, by a cellular network, a plurality of channel quality indicator (CQI) values that correspond to a plurality of UE, wherein:
      for each UE of the plurality of UE, a CQI value of the plurality of CQI values is determined for each carrier component of a plurality of carrier components that make up a carrier aggregation; and
   determining, by the cellular network, an average data transfer rate for each UE of the plurality of UE;
   creating, by a scheduler system of the cellular network, a scheduling matrix comprising a plurality of elements storing a plurality of instantaneous data transfer rates based on the determined plurality of CQI values, wherein:
      each row of the scheduling matrix corresponds to a physical resource block (PRB) of a plurality of PRBs;
      each column of the scheduling matrix corresponds to a UE of the plurality of UE; and
      each PRB of the plurality of PRBs corresponds to one of the plurality of carrier components;
   normalizing, by the scheduler system of the cellular network, each element of the plurality of elements of the scheduling matrix by modifying the plurality of instantaneous data transfer rates based on a plurality of average data transfer rates, wherein:

each average data transfer rate of the plurality of average data transfer rates corresponds to a UE of the plurality of UE mapped to the element of the plurality of elements; and making, by the scheduler system of the cellular network, scheduling decisions for the plurality of UE based on the normalized scheduling matrix.

2. The method for scheduling data transmissions from the base station to the UE of claim 1, further comprising:
transmitting, by the base station of the cellular network, data to the plurality of UE based on the scheduling decisions.

3. The method for scheduling data transmissions from the base station to the UE of claim 1, wherein the cellular network uses 5G New Radio (NR) Radio Access Technology (RAT) for communication with the UE.

4. The method for scheduling data transmissions from the base station to the UE of claim 1, wherein:
for each row of the scheduling matrix, removing entries that correspond to a carrier component of the plurality of carrier components for which the corresponding UE of the row is out of range of communications from the base station on the carrier component.

5. The method for scheduling data transmissions from the base station to the UE of claim 1, wherein:
for each row of the scheduling matrix, removing entries that correspond to a PRB of the plurality of PRBs that is outside of one or more active bandwidth parts (BWPs) for which the corresponding UE of the row is assigned.

6. The method for scheduling data transmissions from the base station to the UE of claim 1, wherein for each UE of the plurality of UE, the CQI value of the plurality of CQI values that corresponds to each carrier component of the plurality of carrier components and the UE are used to calculate the average data transfer rate.

7. The method for scheduling data transmissions from the base station to the UE of claim 1, further comprising:
identifying, by the scheduler system, an element of the plurality of elements of the scheduling matrix that has a maximum value among the plurality of elements.

8. The method for scheduling data transmissions from the base station to the UE of claim 7, further comprising:
assigning the PRB of the plurality of PRBs that corresponds to the element to the UE of the plurality of UE that corresponds to the element.

9. The method for scheduling data transmissions from the base station to the UE of claim 8, further comprising:
determining that an additional PRB is not needed for data transmission to the UE for which the PRB is assigned; and
removing all other entries for the UE within the scheduling matrix in response to determining that the additional PRB is not needed for data transmission to the UE.

10. The method for scheduling data transmissions from the base station to the UE of claim 8, further comprising:
determining that an additional PRB is needed for data transmission to the UE for which the PRB is assigned; and
updating the data transfer rate for all other elements mapped to the UE within the scheduling matrix in response to determining that the additional PRB is needed for data transmission to the UE.

11. The method for scheduling data transmissions from the base station to the UE of claim 10, wherein updating the data transfer rate comprises all other elements mapped to the UE being decreased in magnitude.

12. A cellular network that schedules downlink data transmissions, the cellular network comprising:
a base station that comprises a scheduler system, wherein the base station is configured to:
determine a plurality of channel quality indicator (CQI) values that correspond to a plurality of UE, wherein:
for each UE of the plurality of UE, a CQI value of the plurality of CQI values is determined for each carrier component of a plurality of carrier components that make up a carrier aggregation; and
determine, an average data transfer rate for each UE of the plurality of UE;
create a scheduling matrix comprising a plurality of elements storing a plurality of instantaneous data transfer rates, wherein:
a first dimension of the scheduling matrix corresponds to a physical resource block (PRB) of a plurality of PRBs;
a second dimension of the scheduling matrix corresponds to a UE of the plurality of UE; and
each PRB of the plurality of PRBs corresponds to one of the plurality of carrier components;
normalize each element of the plurality of elements of the scheduling matrix by modifying the plurality of instantaneous data transfer rates based on a plurality of average data transfer rates, wherein:
each average rate of the plurality of average data transfer rates corresponds to a UE of the plurality of UE mapped to the element of the plurality of elements; and
make scheduling decisions for the plurality of UE based on the normalized scheduling matrix.

13. The cellular network that schedules downlink data transmissions of claim 12, wherein the cellular network further comprises the plurality of UE.

14. The cellular network that schedules downlink data transmissions of claim 12, wherein the base station is a gNodeB and the cellular network is a 5G New Radio (NR) radio access technology (RAT) cellular network.

15. The cellular network that schedules downlink data transmissions of claim 14, wherein the cellular network comprises a plurality of base stations that each is configured to perform the functions of the base station.

16. The cellular network that schedules downlink data transmissions of claim 12, wherein the base station is further configured to transmit data to the plurality of UE based on the scheduling decisions.

17. The cellular network that schedules downlink data transmissions of claim 12, wherein the base station is further configured to:
identify an element of the plurality of elements of the scheduling matrix that has a maximum value among the plurality of elements; and
assign the PRB of the plurality of PRBs that corresponds to the element to the UE of the plurality of UE that corresponds to the element.

18. The cellular network that schedules downlink data transmissions of claim 17, wherein the base station is further configured to:
determine that an additional PRB is not needed for data transmission to the UE for which the PRB is assigned; and remove all other entries for the UE within the scheduling matrix in response to determining that the additional PRB is not needed for data transmission to the UE.

\* \* \* \* \*